(No Model.)
F. H. MERRILL.
LIQUID RAISING APPARATUS.
No. 533,228. Patented Jan. 29, 1895.
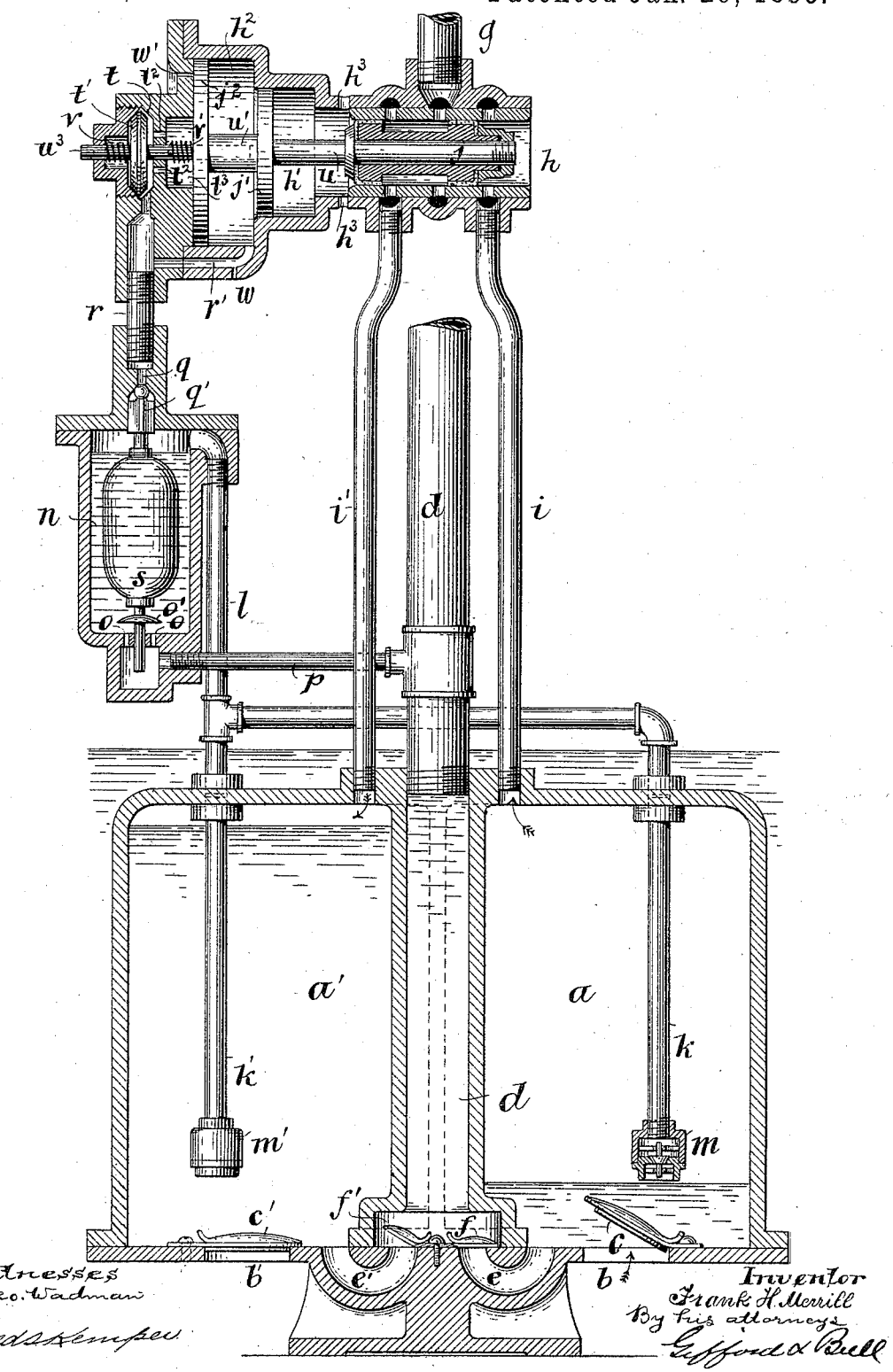
Witnesses
Geo. Wadman
Fred S. Kemper
Inventor
Frank H. Merrill
By his attorneys
Gifford & Bull

UNITED STATES PATENT OFFICE.

FRANK H. MERRILL, OF BOUND BROOK, NEW JERSEY, ASSIGNOR TO THE MERRILL MANUFACTURING COMPANY, OF NEW JERSEY.

LIQUID-RAISING APPARATUS.

SPECIFICATION forming part of Letters Patent No. 533,228, dated January 29, 1895.

Application filed July 31, 1894. Serial No. 519,050. (No model.)

*To all whom it may concern:*

Be it known that I, FRANK H. MERRILL, a citizen of the United States, and a resident of Bound Brook, in the county of Somerset and State of New Jersey, have invented certain new and useful Improvements in Liquid-Raising Apparatus, of which the following is a specification.

The apparatus in which this invention is embodied is also shown in an application filed July 13, 1891, Serial No. 399,287, wherein it is generically claimed and I therefore in this application do not intend to claim the features wherein said apparatus is generically allied to the other apparatus shown in said application.

The accompanying drawing shows a vertical section of an apparatus embodying my present invention.

$a$ and $a'$ are the water compartments provided with the water entrance openings $b$ and $b'$ which are respectively controlled by the valves $c$ and $c'$.

$d$ is the water delivery pipe.

$e$ is the passage connecting the compartment $a$ with the water delivery pipe and controlled by the valve $f'$.

$e'$ is the passage connecting the compartment $a'$ with the water delivery pipe and controlled by the valve $f'$.

$g$ is the compressed air supply pipe.

$h$ is the valve cylinder to which the compressed air is conducted.

$i$ and $i'$ are pipes by which the compressed air is conducted from the valve cylinder to the compartments $a$ and $a'$ respectively.

$j$ is the main valve which determines the flow of the compressed air from the pipe $g$ to the pipes $i$ and $i'$ respectively.

$k$ and $k'$ are pipes leading from near the bottoms of the compartments $a$ and $a'$ respectively, to the pipe $l$.

$m$ and $m'$ are upwardly opening check valves at the mouths of the pipes $k$ and $k'$ respectively.

$n$ is an auxiliary chamber into the top of which the pipe $l$ opens and which is provided at the bottom with the openings $o\ o$ leading into the pipe $p$ which connects with the water delivery pipe $d$ as shown. The auxiliary chamber $n$ is also provided with an opening $q$ which leads through the passage $r$ up to the mechanism by which the main valve is operated.

$o'$ is a valve arranged to partially close the openings $o$. $q'$ is a valve arranged to close the passage $q$. Both the valves $o'$ and $q'$ are connected with the float $s$ so that when the float $s$ is up the valve $q'$ is closed, and when the float $s$ is down the valve $o'$ is nearly closed.

In alignment with the valve cylinder $h$ are the piston cylinder $h'$ containing the piston $j'$ and the piston cylinder $h^2$ containing the piston $j^2$.

$h^3$ are openings leading from the space between valve $j$ and piston $j'$ to the open air.

$r'$ is a passage leading from the cylinder $h^2$ to the passage $r$.

$t$ is a valve chamber for the double conical valve $t'$. This valve chamber communicates by passages $t^2$ with a chamber $t^3$ in front of the piston $j^2$. The piston rod $u$ connects the piston $j'$ with the valve $j$ and the piston rod $u'$ connects the piston $j'$ with the piston $j^2$. The valve stem $u^3$ fits loosely within the piston rod $u'$ and is provided on each side of the valve $t'$ with bearings in the frame, as shown.

$v$ is a spring interposed between the valve $t'$ and the frame.

$v'$ is a spring connected with the valve stem $u^3$ and arranged to bear against the piston $j^2$.

$w$ and $w'$ are minute openings answering to gradually exhaust the air from both sides of the piston $j^2$ without materially impairing the pressure of that air when operating to move the piston.

The operation of the contrivance is as follows: Starting with the compartment $a'$ full of water, as soon as the main valve is thrown into the position shown in the drawing, the valve $c'$ will close, the valve $f'$ will open and the water will be forced out of the compartment $a'$ into the delivery pipe $e'$ until it has fallen below the level of the mouth of pipe $k'$. During all this time the auxiliary chamber $n$ will be filled with water and the float $s$ raised so as to close the passage $q$ and open the passage $o$. Now, however, the air will enter the pipe $k'$ and passing into the top of the auxiliary chamber $n$ will force the water therefrom through the pipe $p$ into the delivery pipe $d$ until there is not sufficient water left to buoy up the float $s$ whereupon that float will fall so as to open the valve $q'$ and partially close the valve $o'$. Now, the compressed air will pass into the cylinder $h^2$ and the chamber $t^3$ wherein the exposed surfaces of the pistons $j'$ and $j^2$ are such as to cause the pistons to move to the left and shift the main valve $j$ to the opposite end of its stroke whereby the pressure is removed from the pipe $i'$ and transferred to the pipe $i$. As soon as this is accomplished, the outside water will raise the valve $c'$ and fill the compartment $a'$ and the compressed air in the pipe $i$ will begin to force the water out of the compartment $a$ into the delivery pipe $d$ and the auxiliary chamber $n$. This will buoy up the float $s$, close the valve $q'$ and open the valve $o'$ whereupon the pressure of the air being cut off from the left hand side of the valve $t'$ and the piston $j^2$ exerting no pressure on the valve stem through the spring $v'$ the spring $v$ will force valve $t'$ to the opposite end of its stroke. The parts will remain in this condition while the air through the pipe $i$ is forming the water in compartment $a$ below the mouth of the pipe $k$ but thereupon the compressed air entering the pipe $k$ will force the water out of the auxiliary chamber $n$, thus cause the float $s$ to drop, open the valve $q'$ and find access to the cylinder $h^2$ but not to the chamber $t^3$ from which it is cut off by the valve $t'$. Now, the surface of the piston $j^2$ within the cylinder $h^2$ is so much greater than the surface of the piston $j'$ that the pistons will be forced back again to the position shown in the drawing and carry the valve $j$ with them so as to shift the pressure back again to the compartment $a'$. Thereupon the auxiliary chamber $n$ will be again filled with water, the float $s$ will be raised so as to cut the pressure off from the valve $t'$ and the position of the piston $q^2$ is such that it exerts a pressure upon the valve stem $u^3$ through the spring $v'$ in antagonism to the spring $v$ and sufficiently great to overcome the spring $v$ and throw the valve $t'$ back into the position shown in the drawing.

I claim—

1. In a liquid raising apparatus having two liquid compartments which are alternately emptied into a liquid delivery pipe and an auxiliary chamber containing a motor whereby access of compressed air to the valve operating mechanism is controlled, the following parts in combination with the main valve, viz: two pistons of different diameters and a valve whereby the compressed air is alternately cut off from and admitted to one side of one of said pistons thereby alternately changing the balance of pressure upon said pistons, substantially as described.

2. In a liquid raising apparatus having two liquid compartments which are alternately emptied into a liquid delivery pipe and an auxiliary chamber containing a motor whereby access of compressed air to the valve operating mechanism is controlled, the following parts in combination with the main valve, viz: two pistons, a valve whereby compressed air is alternately cut off from and admitted to one side of one of said pistons and a spring whereby said valve is shifted as said piston is moved in one direction, substantially as described.

3. In a liquid raising apparatus having two liquid compartments which are alternately emptied into a liquid delivery pipe and an auxiliary chamber containing a motor whereby access of compressed air to the valve operating mechanism is controlled, the following parts in combination with the main valve, viz: two pistons, a valve whereby compressed air is alternately cut off from and admitted to one side of one of said pistons, a spring whereby said valve is shifted as said piston is moved in one direction and means, whereby as said piston is moved in the opposite direction, pressure is exerted to move said valve in antagonism to said spring, substantially as described.

Signed at Bound Brook, in the county of Somerset and State of New Jersey, this 24th day of July, A. D. 1894.

FRANK H. MERRILL.

Witnesses:
H. C. SUYDAM,
L. GIFFORD.